United States Patent [19]

Adamec et al.

[11] Patent Number: 5,444,861
[45] Date of Patent: Aug. 22, 1995

[54] SYSTEM FOR DOWNLOADING SOFTWARE

[75] Inventors: William B. Adamec; Robert E. Cox, both of Enfield; Scott A. Gigandet, East Granby, all of Conn.

[73] Assignee: United Technologies Corporation, Hartford, Conn.

[21] Appl. No.: 317,984

[22] Filed: Oct. 4, 1994

Related U.S. Application Data

[63] Continuation of Ser. No. 890,776, Jun. 1, 1992, abandoned.

[51] Int. Cl.[6] .......................... G06F 15/16; G06F 9/06; G06F 9/24
[52] U.S. Cl. ................................ 395/700; 364/975.1; 364/975.2; 364/DIG. 2
[58] Field of Search ................................ 395/650, 700

[56] References Cited

U.S. PATENT DOCUMENTS

| | | |
|---|---|---|
| 3,906,205 | 9/1975 | Yoshida et al. ............... 235/150.21 |
| 4,061,025 | 12/1977 | Willenbecher et al. .............. 73/116 |
| 4,205,377 | 5/1980 | Oyama et al. ...................... 364/431 |
| 4,521,847 | 6/1985 | Ziehm et al. ........................ 364/184 |
| 4,642,794 | 2/1987 | Lavelle et al. . |
| 4,654,821 | 3/1987 | Lapp . |
| 4,685,947 | 8/1987 | Liska et al. ............................. 65/29 |
| 4,705,552 | 11/1987 | Liska et al. ............................ 65/158 |
| 4,787,050 | 11/1988 | Suzuki . |
| 4,811,284 | 3/1989 | Adler et al. . |
| 4,839,812 | 6/1989 | Nusser et al. ................... 364/424.04 |
| 4,858,108 | 8/1989 | Ogawa et al. . |
| 4,914,576 | 4/1990 | Zelley et al. . |
| 4,967,377 | 10/1990 | Masuda . |
| 5,200,900 | 4/1993 | Adrain et al. ................... 364/431.12 |

Primary Examiner—Kevin A. Kriess
Assistant Examiner—Michael T. Richey
Attorney, Agent, or Firm—Malcolm J. Chisholm, Jr.

[57] ABSTRACT

An improved system is disclosed for downloading, verifying, and/or testing software from a remote programmer to an Electronic Engine Control ("E.E.C.") unit on a gas turbine engine. The invention includes a remote programmer that communicates with the E.E.C. unit through a serial communications link. The E.E.C. unit receives the communications through a serial memory that transmits them to a shared memory and on through a central processing unit ("C.P.U.") to a program memory. A redundant control circuit is controlled by the remote programmer and directs the E.E.C. unit through three operational modes. In a first, or download/verify, mode of operation, the E.E.C. unit may receive and store a boot program. In a second, or program memory, mode, the C.P.U. executes the boot program to allow the C.P.U. to read from and/or write to the program memory in response to communications from the serial channel. In a third, or normal, mode of operation, the C.P.U. can only read from the program memory and an on-board or host computer may replace the remote programmer, so that the C.P.U. executes software stored in the program memory in response to communications received from the host computer to control multiple actuators on the engines, but the host computer cannot access the E.E.C. unit's program memory.

17 Claims, 2 Drawing Sheets

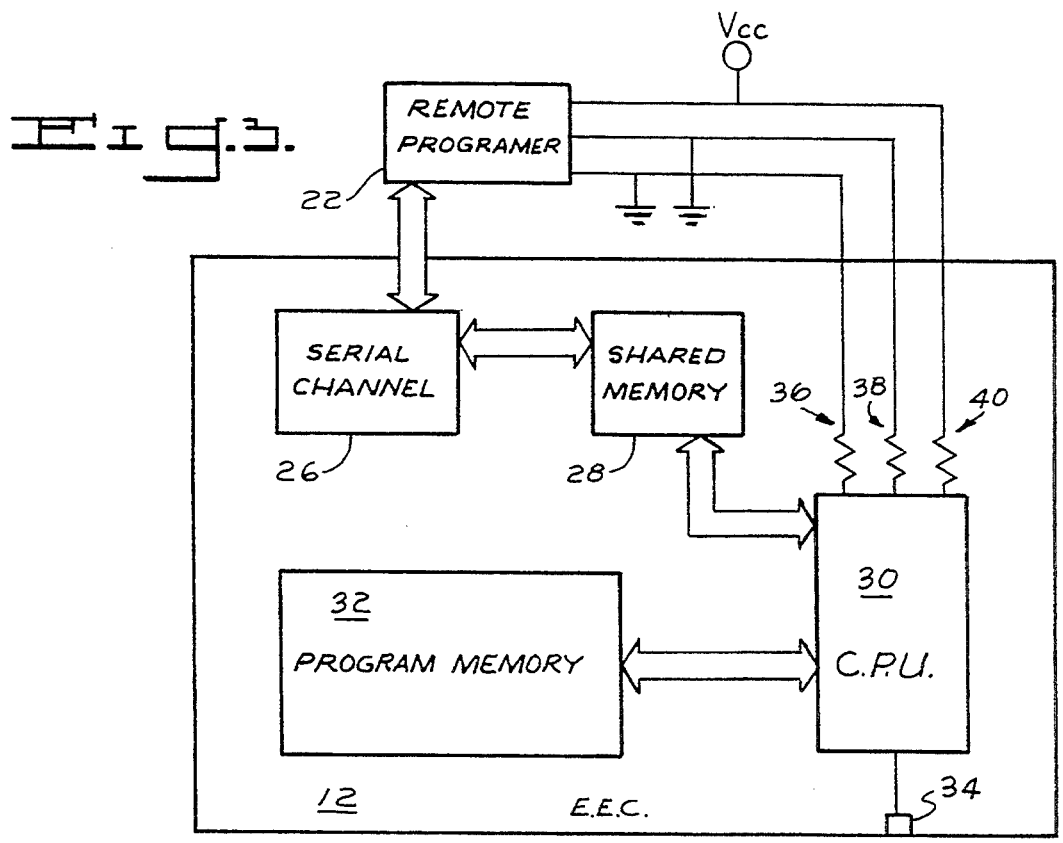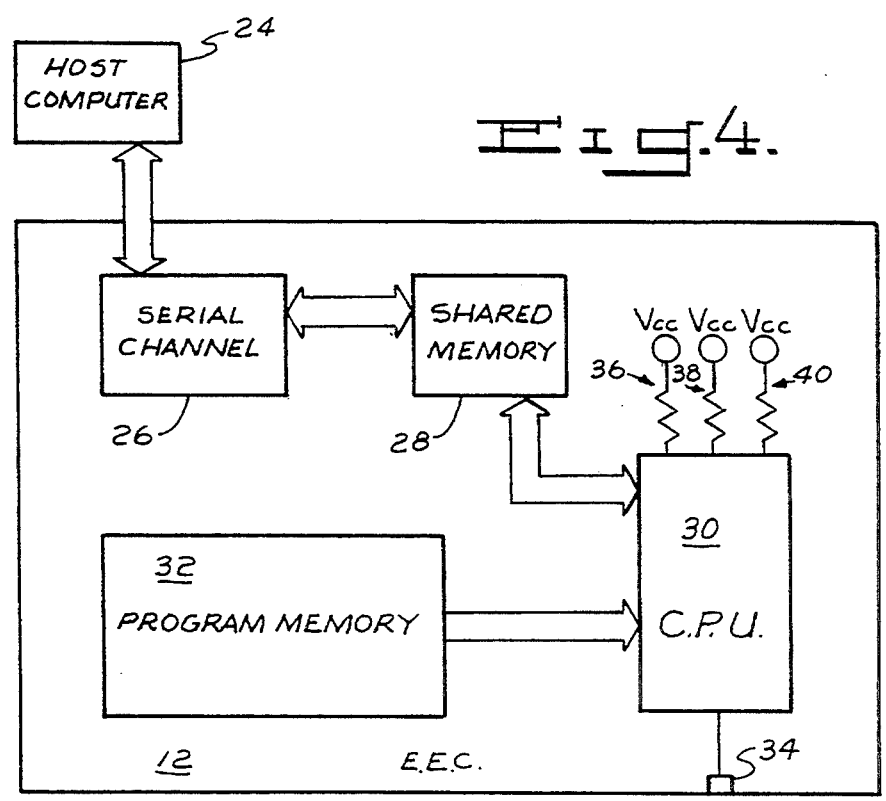

SYSTEM FOR DOWNLOADING SOFTWARE

This application is a continuation of application Ser. No. 07/890,776, filed on Jun. 1, 1992, now abandoned.

BACKGROUND OF THE INVENTION

The present invention relates to a system for downloading software to a control unit by way of a serial communications link. In particular, a software downloading system is disclosed for use in downloading, verifying and/or testing software from a remote programmer or host computer to an unprogrammed, sealed electronic engine control unit on a gas turbine engine.

It is well known on modern aircraft powered by gas turbine engines to control multiple engine functions through a central, on-board or host computer that communicates instructions by way of a shielded serial communications link to an electronic engine control ("E.E.C.") unit on each engine. The E.E.C. unit, in turn, transmits signals to a plurality of actuators, thereby controlling various engine functions. For example, upon commencing a flight, an aircraft operator manipulates a throttle to increase fuel supply to the gas turbine engines. The throttle directs the on-board or host computer to communicate a specific fuel-supply increase to an E.E.C. unit on each engine. Each E.E.C. unit then generates a specific electronic signal and transmits it to an actuator on a torque motor controlling a throttle valve, thereby increasing fuel supply to the engine.

E.E.C. units are typically microprocessor based, and include a data communications link, a central processing unit ("C.P.U."), a program memory, and at least one in/out ("I/O") port. An E.E.C. unit receives instructions in the form of data words from the on-board computer, via its data communications link. In response, the C.P.U. then executes an application code stored in the program memory, and thereby generates and transmits appropriate signals to the actuators, via an electric circuit affixed to the unit's I/O port.

Two major factors have influenced design of current E.E.C. unit hardware architecture. The first factor has been the extremely hostile working environment of a typical aircraft E.E.C. unit adjacent a gas turbine engine. Virtually all such components are exposed to extremes of heat, moisture and vibration, as well as to severe static electricity hazards. Consequently, design of E.E.C. units has tended to produce tightly sealed containers housing the units components, wherein the containers have a minimum number of potential electrical contact points. The second factor influencing design has been a need to frequently change programs stored in E.E.C. units' program memories, and to verify and test resident programs. Therefore, current E.E.C. units are designed to be tested and/or modified prior to and between flights by a technician using a "remote programmer" in place of the host computer.

Known E.E.C. units have utilized at least three distinct hardware-architecture designs to resolve problems arising from inherent tensions between the aforesaid two design influences. A first design enables the E.E.C. unit to remain sealed during downloading, verifying and/or testing by having a test-connector fixture in the container housing the unit, in addition to the unit's data communications link and I/O ports. Such a test connector is utilized for on-board programming of the unit, and also enables a technician to have direct access to the unit's program memory, through the test connector. Test connector fixtures, however, expose the E.E.C. unit to a static-spark contact hazard. Additionally, such a hardware design poses a substantial security risk, because valuable programs stored in the program memory can be read and duplicated by any entity having access to the test connector fixture.

A second common E.E.C. unit design utilizes a special programming station separate from the unit. It enables a technician to remove memory components of the unit's program memory for downloading, verifying and/or testing in the special programming station. Although no additional connector fixture is required in the unit's container, this method requires that the technician be properly trained to open the unit to remove memory components, thereby exposing its circuit boards, chips and other components to possible damage. Additionally, such a removable memory component cannot be volatile, thereby prohibiting utilization of potentially desireable memory components such as static RAMS. Finally, this second design also poses a security risk, because elements of the unit's program memory are removable and transportable.

A third known E.E.C. unit design has resolved some of the problems associated with the first two designs by utilizing a serial communications channel and a boot program that enables the unit's C.P.U. to download, verify and/or test software code. This design requires that the boot software be resident in a memory component of the unit prior to downloading, or that a boot program is first downloaded to a special memory area within the unit, prior to communications with the unit's program memory by a remote programmer or host computer. Such a design minimizes additional connector fixtures and allows the E.E.C. unit's container to remain sealed during downloading, verifying and/or testing. However, the design requires additional memory components in the unit to load and/or store the boot program.

Moreover, this design also poses a security risk because the boot program remains in the unit after it is programmed. This permits a continual access to the unit's program memory via its data communications link.

Consequently, due to inherent design limitations, known E.E.C. units are exposed to severe static spark hazards during ordinary usage; require partial disassembly by highly skilled technicians for downloading, verifying and/or testing software; or, require special memory areas within the unit for boot software. Additionally, all known E.E.C. unit designs pose security risks because their program memories are accessible via their data communication links during ordinary usage.

Accordingly, it is a general object of the present invention to provide a system for downloading software into an E.E.C. unit that overcomes the problems of the prior art.

It is a more specific object to provide a system for downloading software into an E.E.C. unit that utilizes a minimum number of electrical connector fixtures within a container housing components of the unit.

It is another object to provide a system for downloading software into an E.E.C. unit that enables the software in the unit to be changed, verified and/or tested without opening the container housing components of the unit, or removing any of the components.

It is yet another object to provide a system for downloading software into an E.E.C. unit that prohibits access to software loaded into the unit's program memory during ordinary usage of the unit.

The above and other objects and advantages of this invention will become more readily apparent when the following description is read in conjunction with the accompanying drawings.

SUMMARY OF THE INVENTION

A system is disclosed for downloading, verifying and/or testing software from a remote programmer or host computer to an unprogrammed, sealed Electronic Engine Control ("E.E.C.") unit on a gas turbine engine. Software stored in a program memory of an E.E.C. unit is executed by the unit's central processing unit ("C.P.U.") in response to communications from an on-board, or host computer, to control multiple actuators on the engine, thereby controlling the engine.

In the preferred embodiment, the invention comprises an E.E.C. unit containing a serial channel that receives information from a data communications link; a volatile shared memory that communicates with both the serial channel and a C.P.U.; a program memory in communication with only the C.P.U.; at least one in/out ("I/O") port that transfers instructions from the C.P.U. out of the unit to at least one actuator; a redundant control circuit that governs operational modes of the unit; a remote programmer that directs the redundant control circuit, and downloads, verifies and/or tests software in the unit via the data communications link; and a host computer that replaces the remote programmer and communicates with the E.E.C. unit during the unit's normal mode of operation.

In a first, or download/verify, operational mode, a technician operating the remote programmer directs the redundant control circuit to place the C.P.U. in an idle format. The remote programmer can then download boot program software code to the serial channel by way of the unit's data communication link. The serial channel receives the incoming code as serial data words, and automatically stores the code in specified locations in the shared memory. At that point, the remote programmer could optionally request the serial channel to transmit received data back to the remote programmer to verify proper transmission and/or storage.

The remote programmer then directs the control circuit to place the E.E.C. unit in a second, or program software, operational mode, by releasing the C.P.U. from the idle format. The C.P.U. then executes code from the specified location in the shared memory space that received the boot program from the serial channel. The boot program provides a user defined systems protocol that the C.P.U. executes, thereby allowing the C.P.U. to communicate with the remote programmer. The remote programmer can then communicate with the C.P.U. by sending or receiving a series of commands and data words specified in the user defined protocol. The commands would request the C.P.U. to either store or retrieve code in the program memory, thereby downloading, verifying and/or testing software in the program memory.

The remote programmer then directs the control circuit to place the E.E.C. unit in a third, or normal, operational mode, wherein the C.P.U. controls the serial channel, but cannot write to the program memory. A host computer then replaces the remote programmer and communicates through the serial channel and shared memory to the C.P.U. Consequently, in the E.E.C. unit's normal mode of operation, software stored in the program memory is inaccessible by the host computer for two separate reasons. First, the boot program is no longer resident in the volatile shared memory, and second, the control circuit has limited the C.P.U. so that it can only read from the program memory.

BRIEF DESCRIPTION OF THE DRAWINGS

FIG. 3 is a schematic representation of the FIG. 2 system for downloading software, showing the system in a second, or program software, mode of operation; and FIG. 4 is a schematic representation of the FIG. 2 system for downloading software, showing the system in a third, or normal, mode of operation.

DETAILED DESCRIPTION OF THE PREFERRED EMBODIMENT

Figure 1:
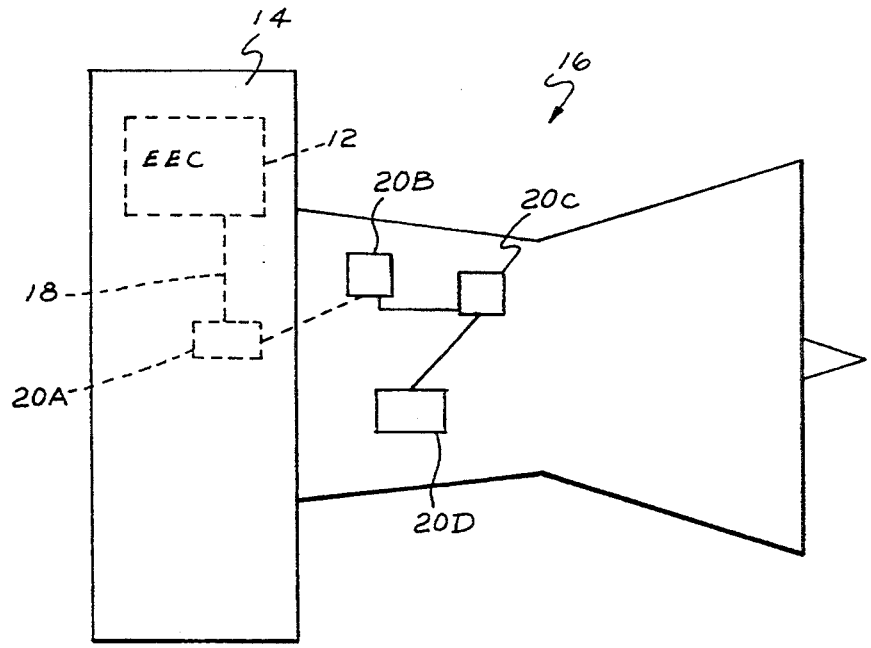
FIG. 1 is a schematic representation showing an Electronic Engine Control ("E.E.C.") unit and a plurality of actuators in their ordinary working environment affixed to a gas turbine engine.
Figure 2:
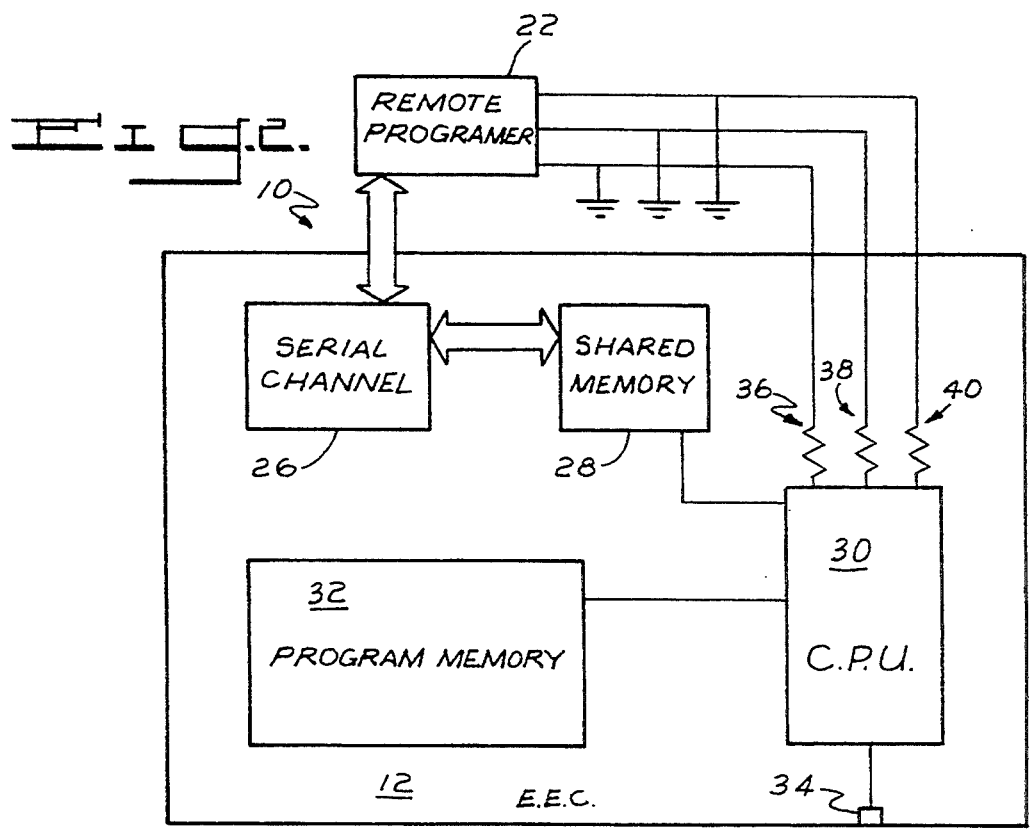
FIG. 2 is a schematic representation of a system for downloading software of the present invention, showing the system in a first, or download/verify, mode of operation.

Referring to the drawings in detail, the preferred embodiment of a system for downloading software of the present invention is shown in schematic representation in FIGS. 2–4, and generally designated by the numeral 10. FIG. 1 shows a typical working environment for a major component of the system 10, its Electronic Engine Control ("E.E.C.") unit 12. The E.E.C. 12 is shown affixed within a fan stage 14 of a gas turbine engine 16, wherein the unit 12 has a standard electric wire 18 leading to a plurality of actuators 20A–D affixed to the engine 16, so that the actuators control multiple engine functions.

As best shown in FIGS. 2–4, the system for downloading software includes a remote programmer 22 (FIGS. 2, 3) and a host computer 24 (FIG. 4), both of which communicate at different times with a serial channel 26 within the E.E.C. unit 12. The serial channel 26, in turn, communicates through a shared memory 28, and central processing unit ("C.P.U.") 30 to a program memory 32, all of which are within the E.E.C. unit 12. The C.P.U. transmits control signals out of the unit 12 via an in/out ("I/O") port 34.

A typical remote programmer 22 that could be used in the present invention is a Digital Equipment Corporation VAX (manufactured by Digital Equipment Corporation, of Maynard, Mass. 01754) with a RS232 serial connection to a Military Standard 1553 piece of test equipment, such as a Loral SSA-100 with MUX I/O card (manufactured by Loral Instrumentation of San Diego, Calif. 92123-1720.) The Loral provides Military Standard 1553B Bus Controller functions and can be controlled remotely with a standard "personal computer" having a serial interface, wherein the 1553B Bus Controller could be a card in the personal computer. "Military Standard 1553B" protocol details are available from the Aeronautical Systems Division, Wright Patterson Air Force Base, Dayton, Ohio 45433.

Similarly, the host computer 24 could be a standard airframe or engine control computer (manufactured by Hamilton Standard, of Windsor Locks, Conn. 06096), having a Military Standard 1553B Bus Controller (manufactured by United Technologies Microelectronics Center ("UTMC"), of Colorado Springs, Colo. 80907-3486). The Bus Controller is implemented in a semi-custom gate array, such as Part No. UT1553B BCRT (manufactured by UTMC, of Colorado Springs, Colo. 80907-3486).

The E.E.C. unit 12 also includes the serial channel 26, such as 1553 Remote Terminal that is implemented in a semi-custom gate array; for example, Part No. UT1553B RTI-1 (manufactured by UTMC, of Colorado Springs, Colo. 80907-3486). The serial channel 26 receives communications from either the remote programmer 22, or the host computer 24. Another component of the E.E.C. unit 12 is the shared memory 28, such as a 8192 by 8 BIT random access static memory ("SRAM"). An example of such a SRAM is Part No. IDT7164, manufactured by Integrated Device Technology, of Santa Clara, Calif. 95054.

The shared memory 28, or SRAM, communicates within the E.E.C. unit 12 with either the serial channel 26, or the C.P.U. 30, which could be a standard microprocessor, such as a 16 BIT internal by 8 BIT external microprocessor, implemented by a semi-custom gate array, including the 1553 Remote Terminal noted above. For example, in the preferred embodiment, the Remote Terminal for the serial channel 26 and the microprocessor making up the C.P.U. 30 are combined together in a MUXIO gate array, such as Part No. UP4-3AL, manufactured by UTMC, of Colorado Springs, Colo. 80907-3486.

As shown in FIGS. 2-4, the C.P.U. 30 also communicates within the E.E.C. unit 12 with the program memory 32, such as a 32768 by 8 BIT Electrically Erasable Programmable Read Only Memory ("EEPROM"); for example, Part No. X28C256, manufactured by XICOR, Inc., of Milpitas, Calif. 95025, or any standard EEPROM. Additionally, the C.P.U. 30 transmits control signals to, and receives signals from, standard actuators 20A–D via the I/O port 34.

As best seen in FIGS. 2 and 3, a first control circuit 40, a second control circuit 38, and a third control circuit 40 comprise standard electrical circuits transmitting varying voltages between the remote programmer 22 and the C.P.U. 30. Operational modes of the E.E.C. unit 12, as described hereinbelow, vary, depending on the voltage applied to the first, second, or third control circuits 36, 38, 40 by a technician (not shown) operating the remote programmer 22. Voltage applied by the three control circuits 36, 38, 40 actuates three pins on the C.P.U. 30, such as three pins on the aforesaid MUXIO gate array, to enable the C.P.U. 30 to operate in the three operational modes described below.

FIG. 2 shows the system for downloading software 10 in a first, or download/verify, mode of operation, wherein the first, second, and third control circuits 36, 38, 40 have each been tied to grounds by a technician operating the remote programmer 22. FIG. 3 shows the system 10 in a second, or program software, mode of operation, wherein the first and second control circuits 36, 38 have been tied to grounds and voltage has been applied to the third control circuit 40. FIG. 4 shows the system 10 in a third, or normal, mode of operation, wherein voltage has been applied to the first, second, and third control circuits 36, 38, 40.

In use of the system for downloading software 10, the E.E.C. unit 12 is received from a manufacturer with no resident code in any of its memory components. A technician utilizes a standard serial communications link (not shown) to connect the remote programmer 22 to the serial channel 26 within the E.E.C. unit 12. As shown in FIG. 2, the remote programmer then ties the first, second, and third control circuits 36, 38, 40 to grounds, placing the system 10 in the first, or download/verify, mode of operation, wherein the serial channel 26 runs automatically; the shared memory 28 is written and/or read by the serial channel 26; and, the C.P.U. 30 is idle.

The remote programmer 22 then downloads a standard boot program software code to the serial channel 26 which automatically stores the boot program sequentially at specified locations in the shared memory 28. The remote programmer 22 could optionally verify proper transmission and storage of the boot program in the shared memory 28, by requesting the serial channel 26 to read and transmit the data received and stored in the shared memory 28 back to the remote programmer 22.

Next, the remote programmer 22 is set to apply a voltage to the third control circuit 40, as shown in FIG. 3, placing the system 10 in the second, or program software, mode of operation. In that mode, the C.P.U. 30 is released from idle and automatically executes the boot program code stored in the shared memory 28. The boot program enables the C.P.U. 30 to read and/or write to the shared memory 28, and read and/or write to the program memory 32. Consequently, the remote programmer 22 can then communicate with the C.P.U. 30 and request that the C.P.U. 30 either store data received from the remote programmer 22 by the serial channel 26 to specified locations in the program memory 32, or retrieve data stored at specified locations in the program memory 32, and transmit the data to the remote programmer 22, as described schematically in FIG. 3.

Therefore, once the boot program is being executed by the C.P.U. 30, the remote programmer has access to the shared memory 28, C.P.U. 30, program memory 32, and I/O port 34. The remote programmer 22 can then download to the E.E.C. unit 12 standard application and/or operation software and verify and/or test the software, while the E.E.C. unit 12 remains in the program software operational mode.

Next, the E.E.C. 10 is set to apply a voltage to the first and second control circuits 36, 38, and the remote programmer 22 is replaced by the host computer 24, placing the system 10 in the third, or normal, mode of operation. In that mode, the C.P.U. 30 controls the serial channel 26; both the C.P.U. 30 and the serial channel 26 have access to the shared memory 28; and the C.P.U. runs from the program memory 32, but cannot write to the program memory, as shown schematically in FIG. 4. Additionally, because the shared memory 28 is a volatile random access static memory ("SRAM"), the boot program previously stored in the shared memory 28 is no longer resident in the E.E.C. unit 12. Consequently, the program memory 32 cannot be accessed by the host computer, while the system 10 is in the third, or normal, mode of operation.

In the normal mode of operation, the C.P.U. 30 executes application software stored in the program memory 32 in response to communications received from the host computer 24, in order to generate control signals transmitted to the actuators 20A–D via I/O port 34, thereby controlling the engine 16.

It should be understood by those skilled in the art that obvious modifications can be made without departing from the spirit of the invention. For example, the present system for downloading software could be used to enhance security of resident software code in microprocessor based control units utilized in a variety of differing work environments, such as automobiles, copy machines, and computer terminal systems. Accordingly, reference should be made primarily to the accompanying claims, rather than the foregoing specification, to determine the scope of the invention.

What is claimed is:

1. A system for downloading software from a remote programmer to an Electronic Engine Control ("E.E.C.") unit comprising:
   a. a serial channel within the E.E.C. unit that receives, communications from and transmits communications to the remote programmer;
   b. a shared memory within the E.E.C. unit that receives, stores, and transmits communications from the serial channel;
   c. a central processing unit ("C.P.U.") within the E.E.C. unit that receives, stores, executes, and transmits communications from the shared memory, and generates control signals for transmission out of the E.E.C. unit by way of an in/out port in the E.E.C. unit;
   d. a program memory within the E.E.C. unit that receives and stores communications from the C.P.U. and transmits communications to the C.P.U.; and
   e. control circuit means for enabling the remote programmer to select either:
      i. a first E.E.C unit operating means for operating the E.E.C. unit in a first mode of operation, wherein the serial channel receives incoming code as serial data words and stores the code in the shared memory; the shared memory is written and/or read by the serial channel; and the C.P.U. is idle, so that the remote programmer can download a boot program through the serial channel for storage in the shared memory, or
      ii. a second E.E.C. unit operating means for operating the E.E.C unit in a second mode of operation, wherein the C.P.U. automatically executes code in the shared memory and is enabled to read and/or write to the shared memory and program memory, so that the remote programmer can download software code through the serial channel, shared memory, C.P.U. to the program memory; or
      iii. a third E.E.C. unit operating means for operating the E.E.C. unit in a third mode of operation, wherein the C.P.U. controls the serial channel; the C.P.U. and the serial channel can read and/or write to the shared memory; and, the C.P.U. reads from, but cannot write to, the program memory, so that the C.P.U. can execute software code stored in the program memory, and the remote programmer cannot access the program memory.

2. The system for downloading software of claim 1, further comprising a host computer means for replacing the remote programmer in said third mode of operation of the E.E.C. unit, so that the host computer transmits communications through the serial channel and shared memory to the C.P.U., and the host computer cannot access the program memory.

3. The system for downloading software of claim 2, wherein the control circuit means includes a plurality of circuits between the remote programmer and the E.E.C. unit.

4. The system for downloading software of claim 3, wherein the shared memory comprises a random access shared memory.

5. The system for downloading software of claim 4, wherein the program memory comprises an electrically erasable, programmable read only memory.

6. The system for downloading software of claim 5, wherein the C.P.U. is adapted to not transmit the boot program from the shared memory to the program memory, so that the boot program is erased from the shared memory when the host computer replaces the remote programmer.

7. In a system for downloading software from a remote programmer to an Electronic Engine Control ("E.E.C.") unit having a serial channel within the E.E.C. unit that receives communications from and transmits communications to the remote programmer; a central processing unit ("C.P.U.") within the E.E.C. unit that receives, stores, executes, and transmits communications from the serial channel, and generates control signals for transmission out of the E.E.C. unit by way of an in/out port; a shared memory within the E.E.C. unit that stores and transmits communications received from the serial channel or C.P.U.; a method of controlling the E.E.C. unit from the remote programmer comprising the steps of:
   a. operating a control circuit to place the E.E.C. unit in a first mode of operation, wherein the serial channel receives incoming code as serial data words and stores the code in the shared memory; the shared memory is written and/or read by the serial channel; and the C.P.U. is idle, so that the remote programmer can download a boot program through the serial channel for storage in the shared memory;
   b. operating a control circuit to place the E.E.C. unit in a second mode of operation, wherein the C.P.U. automatically executes code in the shared memory and is enabled to read and/or write to the shared memory and program memory so that the remote programmer can download software code through the serial channel, shared memory, C.P.U. to the program memory;
   c. operating a control circuit to place the E.E.C. unit in a third mode of operation, wherein the C.P.U. runs the serial channel; the C.P.U. and the serial channel can read and/or write to the shared memory; and the C.P.U. reads from, but cannot write to, the program memory so that the C.P.U. can execute software code stored in the program memory, and the remote programmer cannot access the program memory.

8. The method of controlling the E.E.C. unit of claim 7, including the further step of replacing the remote programmer with a host computer in said third mode of operation of the E.E.C. unit so that the host computer transmits communications through the serial channel and shared memory to the C.P.U., and the host computer cannot access the program memory.

9. The method of controlling the E.E.C. unit of claim 8, including the further step of erasing the boot program stored in the shared memory after the E.E.C. unit is placed in said third mode of operation so that the boot program is no longer resident in the E.E.C. unit.

10. A system for downloading software from a remote programmer to an Electronic Engine Control ("E.E.C.") unit comprising:
   a. a serial channel within the E.E.C. unit that receives, communications from and transmits communications to the remote programmer;
   b. a shared memory within the E.E.C. unit that receives, stores, and transmits communications from the serial channel;
   c. a central processing unit ("C.P.U.") within the E.E.C. unit that receives, stores, executes, and transmits communications from the shared memory, and generates control signals for transmission out of the E.E.C. unit by way of an in/out port in the E.E.C. unit;
   d. a program memory within the E.E.C. unit that receives and stores communications from the C.P.U. and transmits communications to the C.P.U.; and
   e. a first control circuit, a second control circuit and a third control circuit that transmit varying voltages between the remote programmer and three separate pins on the C.P.U. for operating the E.E.C. unit in:
      i. a first mode of operation, wherein the serial channel receives incoming code as serial data words and stores the code in the shared memory; the shared memory is written and/or read by the serial channel; and the C.P.U. is idle, so that the remote programmer can download a boot program through the serial channel for storage in the shared memory, or
      ii. a second mode of operation, wherein the C.P.U. automatically executes code in the shared memory and is enabled to read and/or write to the shared memory and program memory, so that the remote programmer can download software code through the serial channel, shared memory, C.P.U. to the program memory; or
      iii. a third mode of operation, wherein the C.P.U. controls the serial channel, the C.P.U. and the serial channel can read and/or write to the shared memory; and, the C.P.U. reads from, but cannot write to, the program memory, so that the C.P.U. can execute software code stored in the program memory, and the remote programmer cannot access the program memory.

11. The system for downloading software of claim 10, wherein, in the first mode of operation, the three C.P.U. pins have been tied to grounds by the first, second and third control circuits.

12. The system for downloading software of claim 10, wherein, in the second mode of operation, two C.P.U. pins have been tied to grounds by the first and second control circuits, and a voltage has been applied to a third C.P.U. pin by the third control circuit.

13. The system for downloading software of claim 10, wherein, in the third mode of operation, a voltage has been applied to the three C.P.U. pins by the first, second and third control circuits.

14. The system for downloading software of claim 10, further comprising a host computer for replacing the remote programmer in the third mode of operation of the E.E.C. unit, so that the host computer transmits communications through the serial channel and shared memory to the C.P.U., and the host computer cannot access the program memory.

15. The system for downloading software of claim 10, wherein the shared memory comprises a random access shared memory.

16. The system for downloading software of claim 10, wherein the program memory comprises an electronically erasable, programmable read only memory.

17. The system for downloading software of claim 10, wherein the C.P.U. does not transmit the boot program from the shared memory to the program memory and the boot program memory is erased from the shared memory when the E.E.C. unit is in the third mode of operation.

* * * * *